US 12,358,384 B2

(12) United States Patent
Niederhauser et al.

(10) Patent No.: US 12,358,384 B2
(45) Date of Patent: Jul. 15, 2025

(54) FERRITE WINGS SYSTEMS AND METHODS FOR INDUCTIVE WIRELESS POWER TRANSFER

(71) Applicant: MAGMENT GMBH, Oberhaching (DE)

(72) Inventors: Steven Niederhauser, San Diego, CA (US); Mickel Budhia, Auckland (NZ); Dorde Lekic, Banja Luka (BA); Mauricio Esguerra, Taufkirchen (DE); Rafael Acevedo, Bethesda, MD (US)

(73) Assignee: MAGMENT GMBH, Oberhaching (DE)

( * ) Notice: Subject to any disclaimer, the term of this patent is extended or adjusted under 35 U.S.C. 154(b) by 0 days.

(21) Appl. No.: 18/357,752

(22) Filed: Jul. 24, 2023

(65) Prior Publication Data

US 2024/0029948 A1    Jan. 25, 2024

Related U.S. Application Data

(60) Provisional application No. 63/391,434, filed on Jul. 22, 2022.

(51) Int. Cl.
*H02J 50/10* (2016.01)
*B60L 53/12* (2019.01)
(Continued)

(52) U.S. Cl.
CPC ............ *B60L 53/12* (2019.02); *H01F 27/366* (2020.08); *H01F 38/14* (2013.01); *H02J 50/10* (2016.02); *H02J 50/70* (2016.02)

(58) Field of Classification Search
CPC .......... B60L 53/12; B60L 5/005; B60L 53/38; H01F 27/366; H01F 38/14; H02J 50/10;
(Continued)

(56) References Cited

U.S. PATENT DOCUMENTS

| 2014/0327394 A1 | 11/2014 | Asselin et al. |
| 2015/0380157 A1* | 12/2015 | Green ................... B60L 53/12 336/170 |

(Continued)

FOREIGN PATENT DOCUMENTS

| CN | 102625750 B | * | 4/2015 | .............. B60L 5/005 |
| CN | 107431364 A | * | 12/2017 | .............. B60L 53/12 |

(Continued)

OTHER PUBLICATIONS

Written Opinion of the International Search Authority for PCT International Application No. PCT/IB2023/000473 dated Jan. 29, 2024.

(Continued)

*Primary Examiner* — Daniel Cavallari
(74) *Attorney, Agent, or Firm* — RAPHAEL BELLUM PLLC

(57) ABSTRACT

Systems and devices for wireless power transmission is provided. A system includes a ground assembly and a vehicle assembly. The ground assembly includes a primary coil and a magnetic permeable core. The vehicle assembly includes a secondary coil capable of being inductively coupled to the primary coil and one or more magnetic permeable wings disposed on top of the secondary coil. Each of the one or more magnetic permeable wings overlap the secondary coil such that each of the one or more magnetic permeable wings extend within and beyond a periphery of the secondary coil for generating additional coupling between the primary coil and the secondary coil.

10 Claims, 10 Drawing Sheets

(51) Int. Cl.
*H01F 27/36* (2006.01)
*H01F 38/14* (2006.01)
*H02J 50/70* (2016.01)

(58) Field of Classification Search
CPC ...... H02J 50/70; Y02T 10/70; Y02T 10/7072; Y02T 90/14
See application file for complete search history.

(56) References Cited

U.S. PATENT DOCUMENTS

| | | |
|---|---|---|
| 2018/0316194 A1 | 11/2018 | Nakane et al. |
| 2018/0374624 A1* | 12/2018 | Yuasa ..................... H01F 27/08 |
| 2019/0006094 A1* | 1/2019 | Furiya ..................... H01F 27/06 |
| 2019/0148065 A1 | 5/2019 | Naruse et al. |
| 2021/0193382 A1 | 6/2021 | Canete Cabeza et al. |
| 2022/0247233 A1* | 8/2022 | Mohammad .......... H01F 27/366 |

FOREIGN PATENT DOCUMENTS

| | | | |
|---|---|---|---|
| CN | 108806959 A | 11/2018 | |
| EP | 3082141 A1 * | 10/2016 | ............. B60L 53/12 |
| EP | 3082141 B1 * | 11/2020 | ............. B60L 53/12 |

OTHER PUBLICATIONS

International Search Report for PCT International Application No. PCT/IB2023/000473 dated Jan. 25, 2024.

* cited by examiner

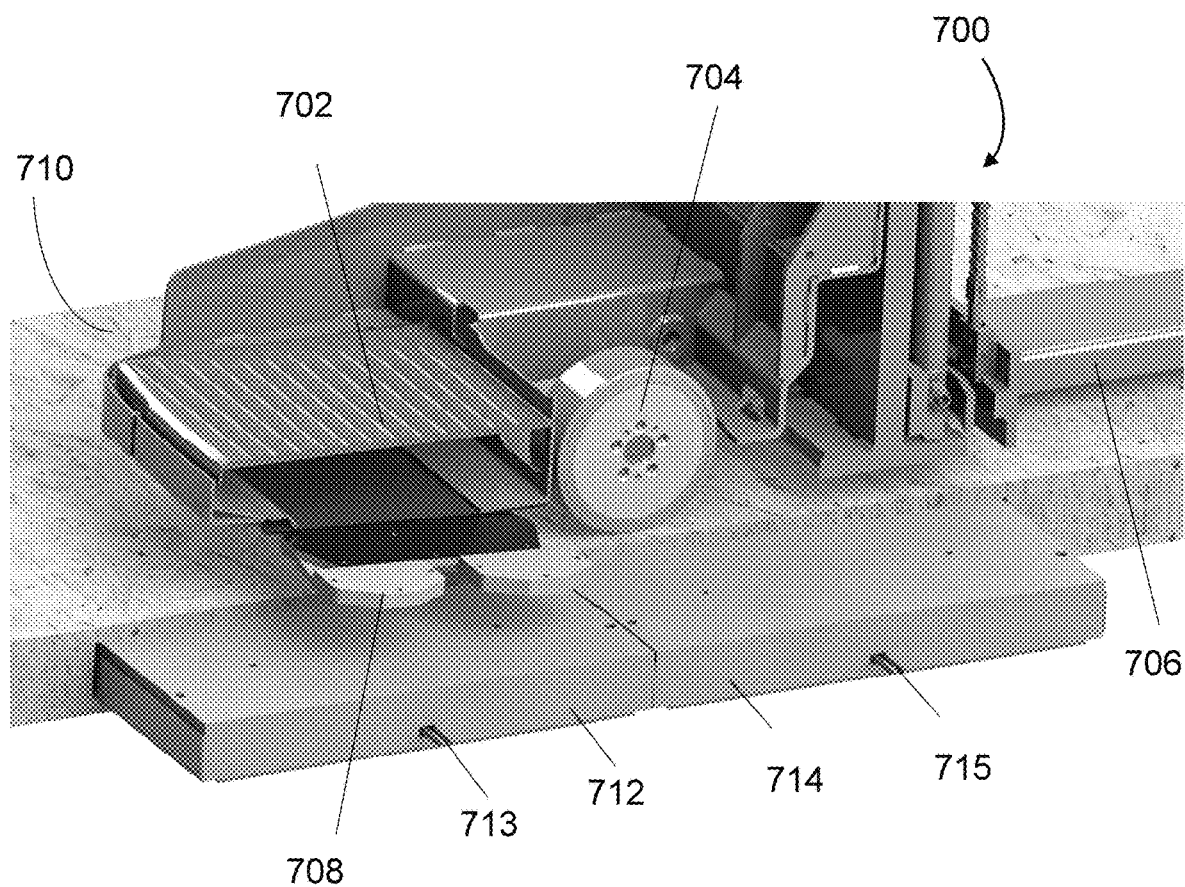
FIG. 7A
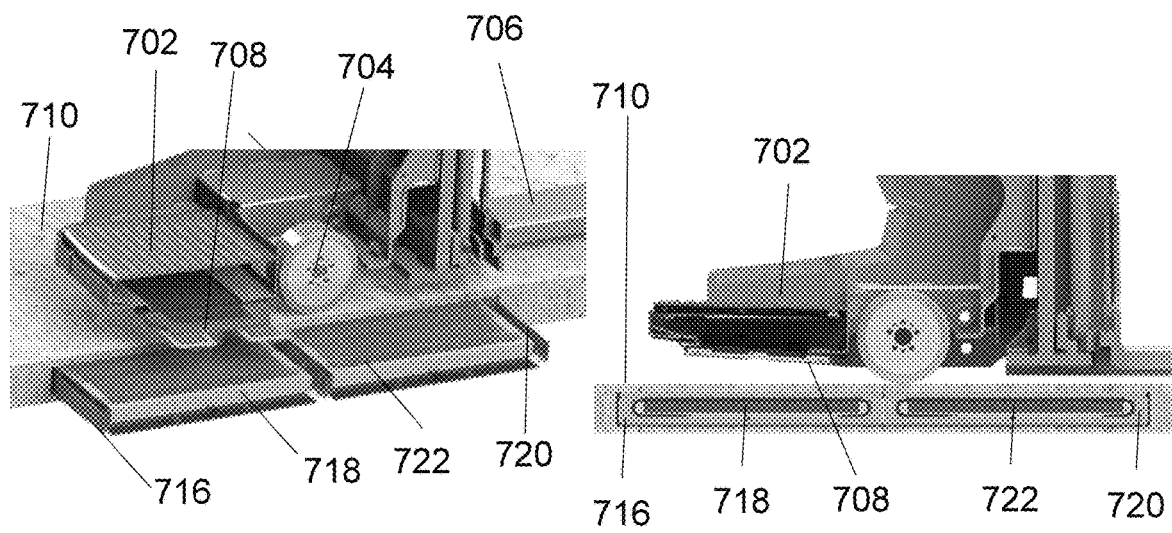
FIG. 7B        FIG. 7C

FERRITE WINGS SYSTEMS AND METHODS FOR INDUCTIVE WIRELESS POWER TRANSFER

TECHNICAL FIELD

This invention relates to inductive wireless power transfer, and more specifically to dynamic wireless power transfer devices, systems, and methods, including those to vehicles, battery charging systems, and coupling coil topologies.

BACKGROUND

Wireless power transfer, also known as inductive power transfer (IPT), facilitates both uni- and bi-directional power transfer, over small and large air gaps, and at power levels ranging up to hundreds of kilowatts, and efficiencies as high as 96%. It is safe, environmentally inert, convenient, and reliable. Applications of IPT technology continue to grow, with applications ranging from cell phone battery charging to vehicle charging and dynamic wireless charging systems.

Inductive wireless power transfer happens when a primary coil (transmitter) is excited with an alternating electric current at a given frequency. This generates a magnetic flux in the primary coil. A secondary coil (receiver) in close proximity to the primary coil is influenced by this magnetic flux and a current can be induced in the secondary coil due to the presence of the magnetic flux emanating from the primary coil.

Magnetic coefficient of coupling is a parameter to assess the ability of the secondary coil to receive magnetic flux from the primary coil. Coupling is dependent upon coil geometry and x, y, and z position of the secondary coil with respect to the primary coil.

The coupling coefficient (k) is calculated by the formula below. M is the mutual inductance of the primary and secondary coil and $L_1$ and $L_2$ are the self-inductance values of the primary and secondary coil, respectively.

$$k = \frac{M}{\sqrt{L_1 L_2}}$$

Inductive coupling includes near field wireless transmission of electrical energy between two conductors, such as magnetically coupled coils. The amount of electromagnetic/inductive coupling between two conductors is measured by their mutual inductance, where the coupling between the two conductors can be increased by winding them into coils and placing them relatively close to one another in an orientation in which a magnetic field induced in one of the coils intersects and/or passes through the other coil. The transmission of electrical energy via inductive coupling can be used to transfer energy, such as in wireless charging. That is, when the magnetic field generated by the primary coil fluctuates, an alternating current is generated in the secondary coil through induction. This current is then rectified and regulated by electronics within a device associated with the secondary coil. This converted current is used to charge a battery or otherwise power the device associated with the secondary coil.

SUMMARY

The dynamic wireless power transfer systems and devices of the invention include contactless connector devices and a contactless connector system that uses inductive coupling between coils. The systems of the invention include contactless power transmission devices.

The invention includes ferrite wings that provide an additional coil geometry to improve coupling between a primary coil and a secondary coil. The invention adds additional pieces of ferrite on top of the secondary coil to improve inductive wireless power transfer when the primary coil is excited with an alternating current (AC) at a given frequency. The magnetic flux generated in the primary coil induces current in the secondary coil. With the addition of additional pieces of ferrite on top of the secondary coil, coupling is increased substantially, and continuous power transfer is ensured.

The invention improves alignment between the secondary coil and the primary coil to improve mutual inductance and power transfer. The coupling coefficient—indicative of the effectiveness of the power transfer between the coils—is maintained, and continuous power transfer is preserved to keep vehicle batteries charged. Increased coupling is particularly improved in the transition from a first primary coil to a second primary coil.

The invention allows the use of the same basic transmitter coil for different ground clearances and the use of wings of varying dimensions depending on the distance between transmitter and receiver coils to compensate for the loss of coupling with distance between the coils. This allows for industrialization of the main coil that can be used for different types of vehicles, while maintaining coupling and power transfer efficiency by varying the size of the wings, while using less ferrite material than that required for increasing the size of the main receiver coil.

BRIEF DESCRIPTION OF THE DRAWINGS

FIGS. 7A-7C show a combined dynamic wireless charging system in accordance with the invention, including a ground assembly including a transmitter coil and a vehicle assembly including a receiver coil.

DETAILED DESCRIPTION

Dynamic wireless power transfer, meaning transferring power while a receiver or secondary coil is in motion above a plurality of transmitter or primary coils, typically suffers from very low or no coupling when the receiver coil is misaligned from a given transmitter coil. As motion continues, the receiver coil will begin to have coupling in an adjacent transmitter coil. That is, a different transmitter coil generates the magnetic field that creates a current in the receiver coil.

The invention addresses problems with very low or no coupling when the receiver coil is misaligned from a given transmitter coil. The receiver coil can be moving with respect to the transmitter coil. Alternatively, the receiver coil may be stationary with respect to the transmitter coil. Previously, as motion continued, the receiver coil would begin to have coupling with an adjacent transmitter coil. The invention improves alignment between the receiver coil and the transmitter coil to improve power transfer. That is, by adding wings of magnetic material to the receiver coil the surface area associated with the receiver coil and a magnetic field associated with the receiver coil is modified based on the wings.

Figure 1:
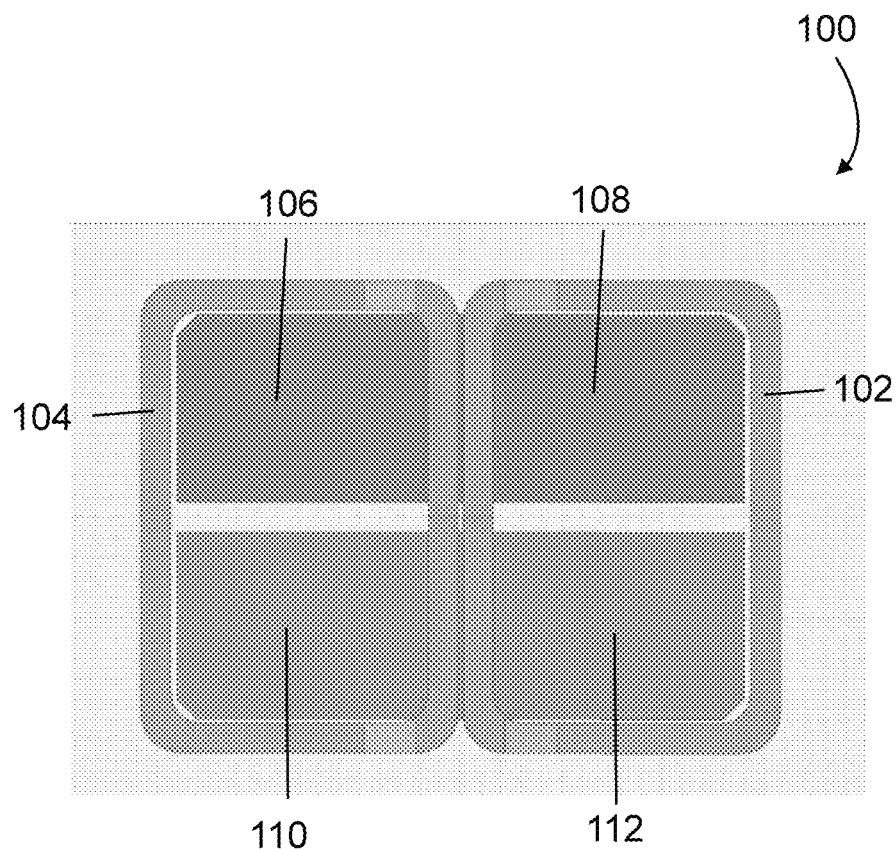
FIG. 1 shows a related art receiver coil design.
Figure 2:
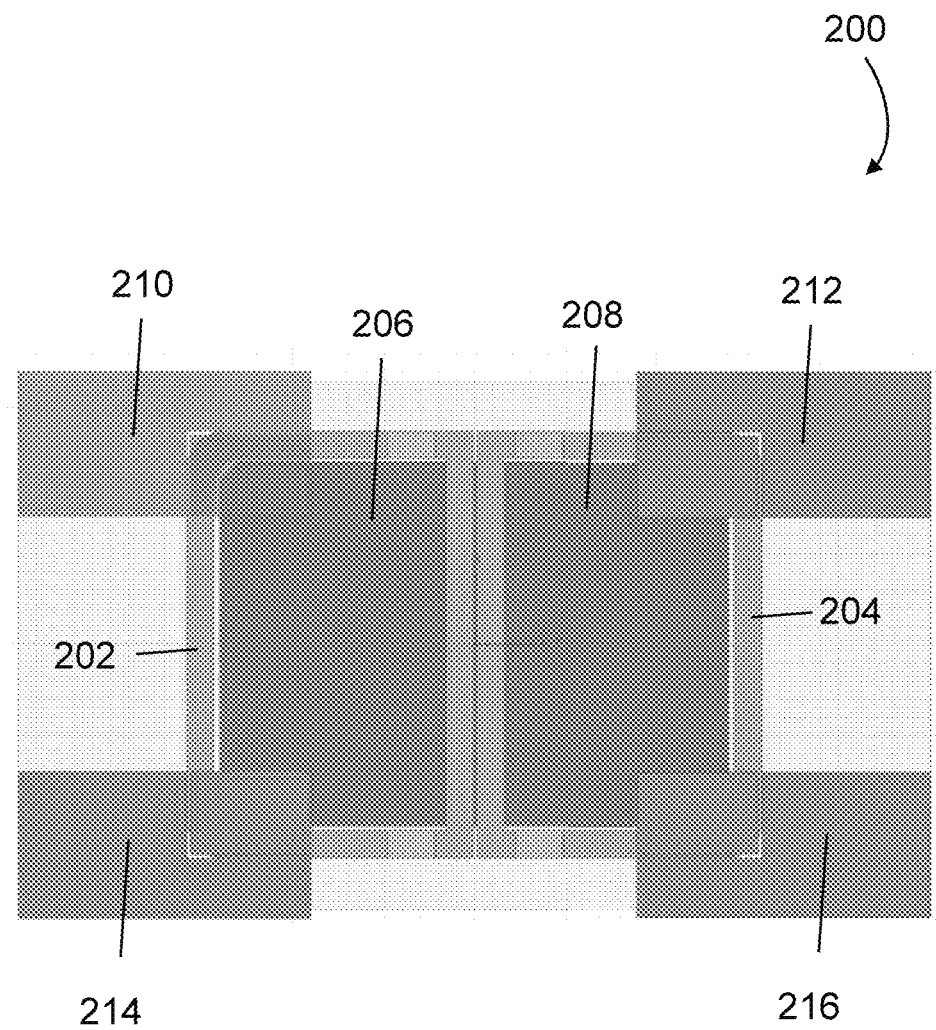
FIG. 2 shows a ferrite wing receiver coil configuration in accordance with the invention.

FIG. 1 below shows a related art coil design, while FIG. 2 shows a ferrite wing configuration in accordance with the invention.

Referring to FIG. 1, receiver coil 100 includes a double D coil having a first loop 102 and a second loop 104. As illustrated in FIG. 1, two ferromagnetic cores are disposed within each loop of receiver coil 100. That is, first loop 102 includes ferromagnetic cores 108 and 112 and second loop 104 includes ferromagnetic cores 106 and 110.

Referring to FIG. 2, receiver coil 200 includes a double-D coil having a first loop 202 and a second loop 204. As illustrated in FIG. 2, one ferromagnetic core is disposed within each loop of the receiver coil 200. That is, first loop 202 includes ferromagnetic core 206 and second loop 204 includes ferromagnetic core 208.

While FIG. 2 illustrates that receiver coil 200 is a double-D coil, receiver coil 200 can include one or more various types of coils including a single-layer coil, a multi-layer coil, a double-D coil, a circular coil, a rectangular coil, a planar spiral coil, a solenoid coil, a toroidal coil, or a coil having any desired size, shape, efficiency, or power rating that provides adequate power transfer. In addition, any number of ferromagnetic cores may be used.

Receiver coil 200 further includes ferrite wings 210, 212, 214, and 216 that provide an additional coil geometry to improve coupling between a primary coil and a secondary coil. While FIG. 2 includes four ferrite wings 210, 212, 214, and 216, receiver coil 200 may include any number of ferrite wings to achieve a desired surface area and magnetic field.

In the receiver coil 200, the core assembly (e.g., coil and ferromagnetic core) is similar to the core assembly of receiver coil 100. However, the ferrite wings 210, 212, 214, and 216 are added to improve the coupling of the system. The size, shape, and positioning of the ferrite wings 210, 212, 214, and 216 may be selected to provide the required flexibility for the receiver coil 200 to operate at different power levels, air gaps, and/or alignment requirements. Such configurations provide highly efficient and optimized power transmission to different types of vehicles and/or applications.

Any type of ferromagnetic core material can be used for the cores and/or the wings 210, 212, 214, and 216. Specifically, the ferromagnetic material may be any material that exhibits strong magnetic properties when exposed to an external magnetic field. Exemplary ferromagnetic material includes iron, cobalt, nickel, alnico, ceramic ferrite compounds, permalloy, amorphous metal alloys, rare earth magnets, etc. The ferromagnetic material may be a single material or a combination of different kinds of ferromagnetic material. In addition, the ferromagnetic material may also be combined with one or more binders such as gypsum, lime, asphalt, cement, polyepoxides, elastomers, thermoplastics, or duroplastics. The ferromagnetic material used for the cores can be the same or different from the ferromagnetic material used for the wings 210, 212, 214, and 216.

As illustrated in FIG. 2, additional pieces of ferrite 210, 212, 214, and 216 are provided on top of portions of the first loop 202 and the second loop 204 of the receiver coil 200. Ferrite wings 210, 212, 214, and 216 improve inductive wireless power transfer when a transmitter coil is excited with an AC current at a given frequency. The magnetic flux generated in the transmitter coil induces a current in the receiver coil 200. With the addition of additional pieces of ferrite 210, 212, 214, and 216 on top of the first loop 202 and the second loop 204 of receiver coil 200, coupling is increased substantially, and continuous power transfer is ensured. With the addition of ferrite wings 210, 212, 214, and 216, the overall surface area of the receiver coil 200 and thus the resulting area capable of detecting the magnetic flux generated by a transmitter coil is increased.

In an embodiment, dynamic wireless power transfer is improved as the receiver coil 200 including the ferrite wings 210, 212, 214, and 216 moves above one or more transmitter coils. The wing geometry addresses shortcomings in prior systems that typically suffer from very low or no coupling when the secondary coil is misaligned from a primary coil. That is, the ferrite wings 210, 212, 214, and 216 create a greater surface area such that alignment is achieved beyond the first loop 202, the second loop 204, and the ferromagnetic cores 108 and 112. An increased surface area of the receiver coil 200 allows for greater opportunity to create the alignment needed to detect the magnetic field generated by a transmitter coil as well as generate an AC current within the receiver coil 20 in response to detecting the magnetic field.

While not illustrated in FIG. 2, the first loop 202 and/or the second loop 204 can further include a terminal in communication with a battery or power generation device. That is, the current generated within the first loop 202 and/or the second loop 204 of the receiver coil 200 flows to the battery or power generation device via the terminal for the power transfer and generation. In an embodiment, receiver coil 200 is coupled with a device such as a vehicle, machine, or other device that is configured for wireless charging.

Figure 3:
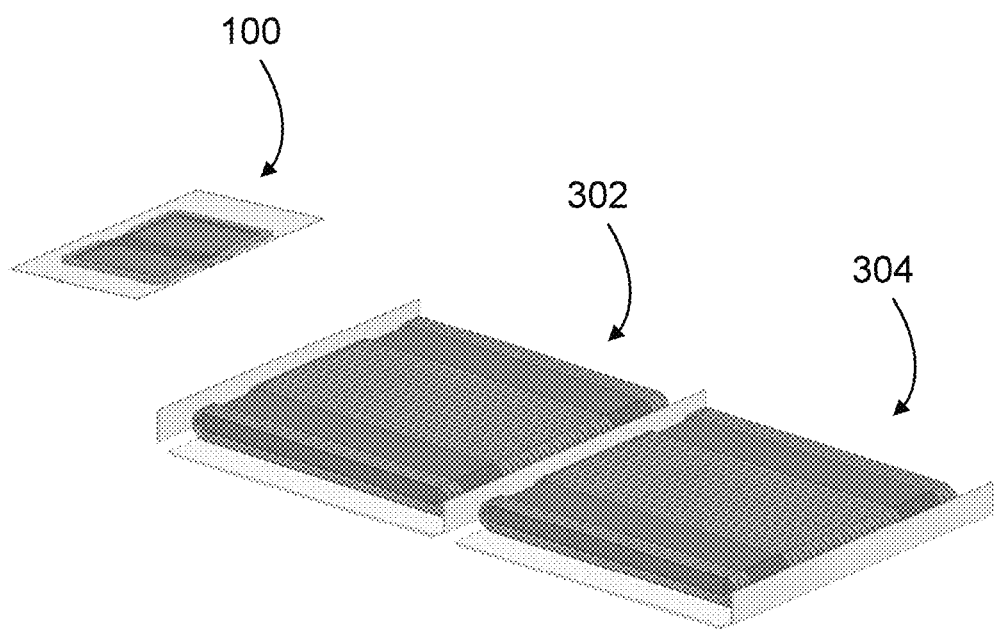
FIG. 3 shows a related art receiver coil above two adjacent transmitter coils.
Figure 4:
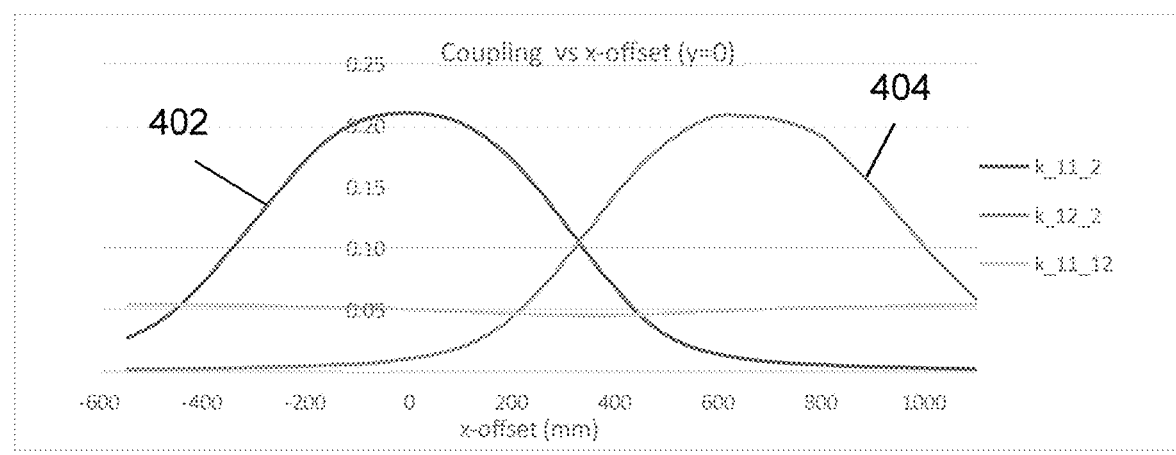
FIG. 4 shows a coupling plot as a related art receiver coil with no wings that transits above two transmitter coils.
Figure 5:
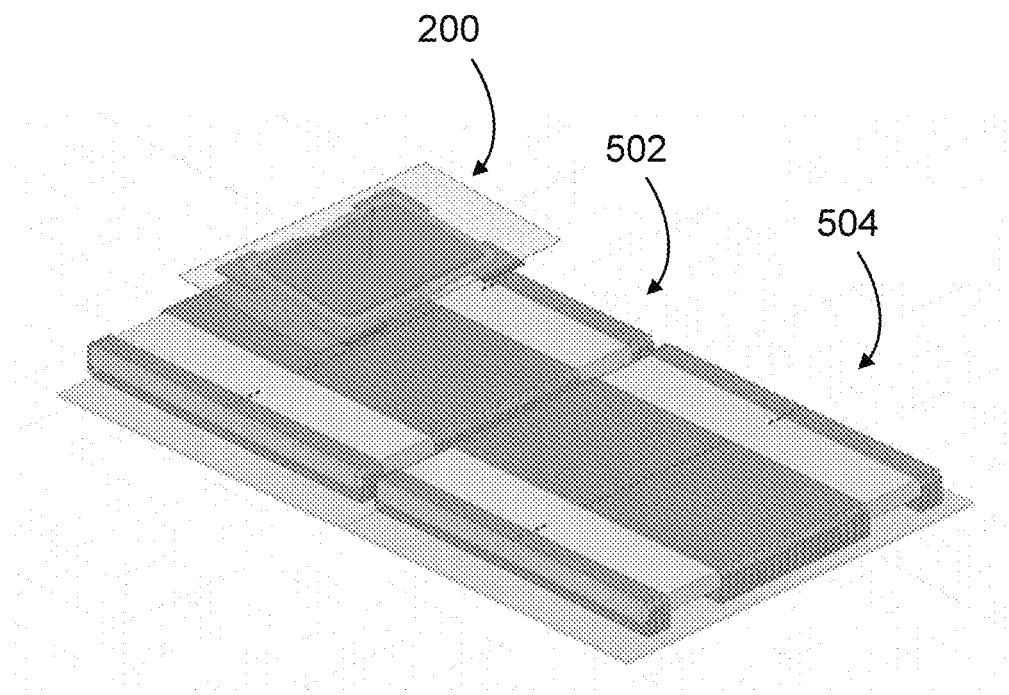
FIG. 5 illustrates a receiver coil with ferrite wings above two adjacent transmitter coils in accordance with the invention.
Figure 6:
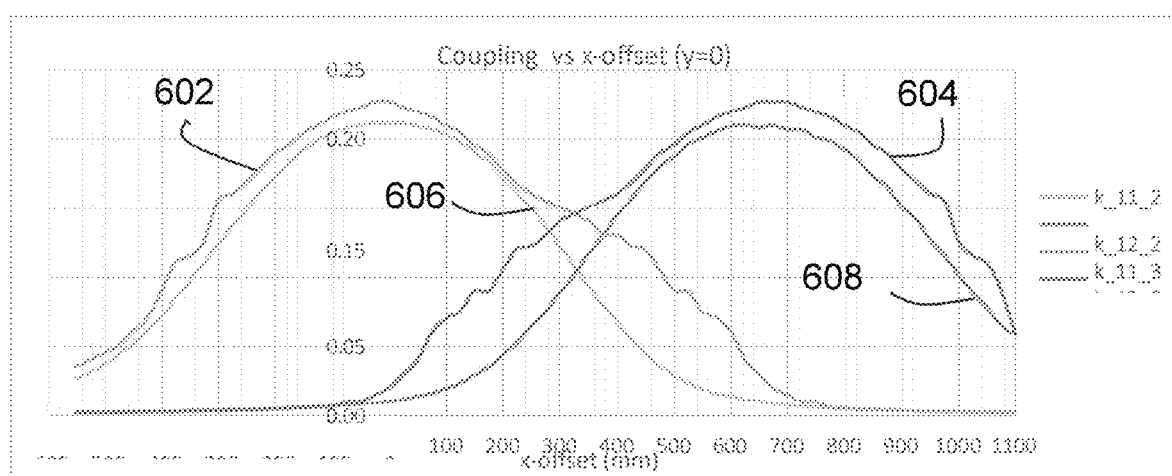
FIG. 6 shows a coupling comparison of a related art receiver coil without wings and a receiver coil with wings in accordance with the invention.

FIG. 3 shows a related art receiver coil above two primary transmitter coils. FIG. 4 shows a coupling plot of a related art receiver coil with no wings that transits above two transmitter coils. FIG. 5 illustrates a receiver coil with ferrite wings above two adjacent transmitter coils in accordance with the invention. FIG. 6 shows a coupling comparison of a related art receiver coil without wings and a receiver coil with wings in accordance with the invention.

Referring to FIGS. 3 and 4, as receiver coil 100 moves into alignment with a first transmitter coil 302, a first coupling 402 occurs. As receiver coil 100 moves into alignment with a second transmitter coil 304, a second coupling 404 occurs.

Specifically, FIG. 4 shows 402 ($k\_11\_2$) which is coupling between the receiver coil 100 and the first transmitter coil 302, then 404 ($k\_12\_2$) shows coupling between the receiver coil 100 and the second transmitter coil 304. In the design of this particular system, the coupling coefficient is at least 0.15 for efficient and continuous power transfer so there are significant x-direction positions where no power transfer will happen as a receiver coil transits between adjacent transmitter coils. When continuous power transfer does not occur, the battery or power source of the device associated with the receiver coil 100 does not charge.

Referring to FIGS. 5 and 6, as receiver coil 200 with ferrite wings moves into alignment with a first transmitter coil 502, a first coupling 602 occurs. As receiver coil 200 moves into alignment with a second transmitter coil 504, a second coupling occurs 604. As illustrated in FIG. 6, the couplings 602 and 604 created with receiver coil 200 start sooner and are maintained longer than couplings 606 and 608 that occur with receiver coil 100.

Specifically, as can be seen in FIG. 6, the addition of wings results in increased coupling (k_11_3 and k_12_3) across the x-position plot and a particularly higher increased region during the transition period from the first to the second primary coil. Plots 602 and 604 correspond to the coupling of the receiver coil 200 system with wings, and plots 606 and 608 show the coupling of the receiver coil 100 system without wings. The coupling coefficient was optimized to be 0.15 in this region which means that continuous power transfer is possible with the receiver coil 200.

With the addition of additional pieces of magnetic material (ferrite) in a specific position on top of the receiver coil 200 (e.g., wings 210, 212, 214, and 216), coupling can be increased substantially. This can be seen comparing the geometry shown in FIG. 1 and FIG. 2 and inspecting the power transmission systems depicted in FIG. 3 and FIG. 5.

FIGS. 7A-7C show an exemplary dynamic wireless charging system in accordance with the invention, including a ground assembly and a vehicle assembly.

Referring to FIGS. 7A-7C, vehicle assembly 700 is a forklift including chassis 702, a drive wheel 704, and fork 706. Receiving coil 708 is mounted to vehicle assembly 700 either during or after manufacturing of the vehicle assembly 700. In addition, receiving coil 708 can be an integrated part of vehicle assembly 700 or an additional part that is mounted onto the vehicle and then electrically coupled with the power source.

While vehicle assembly 700 is illustrated in FIGS. 7A-7C as a forklift, vehicle assembly 700 can be any type of vehicle or device that is charged through wireless power transfer. For example, vehicle assembly 700 can be any device that is configured for movement and moves under its own power such as cars, trucks, industrial vehicles, farm equipment, buses, motorcycles, bicycles, vans, sports utility vehicles, mini-vans, recreational vehicles, electric vehicles, trains, aircraft, boats, etc.

As vehicle assembly 708 moves over floor 710, receiving coil 708 is capable of coming into alignment with transmitter coils 712, 714. That is, transmitter coils 712, 714 are embedded within the floor 710. While two transmitter coils 712, 714 are illustrated in FIGS. 7A-7C, any number of transmitter coils may be embedded within the floor 710 in any pattern or arrangement.

Each of the transmitter coils 712, 714 includes a terminal 713, 715 that connects with a power source, a coil assembly 718, 722, and a housing 716, 720 configured to protect the coil assembly 718, 722.

Figure 8A:
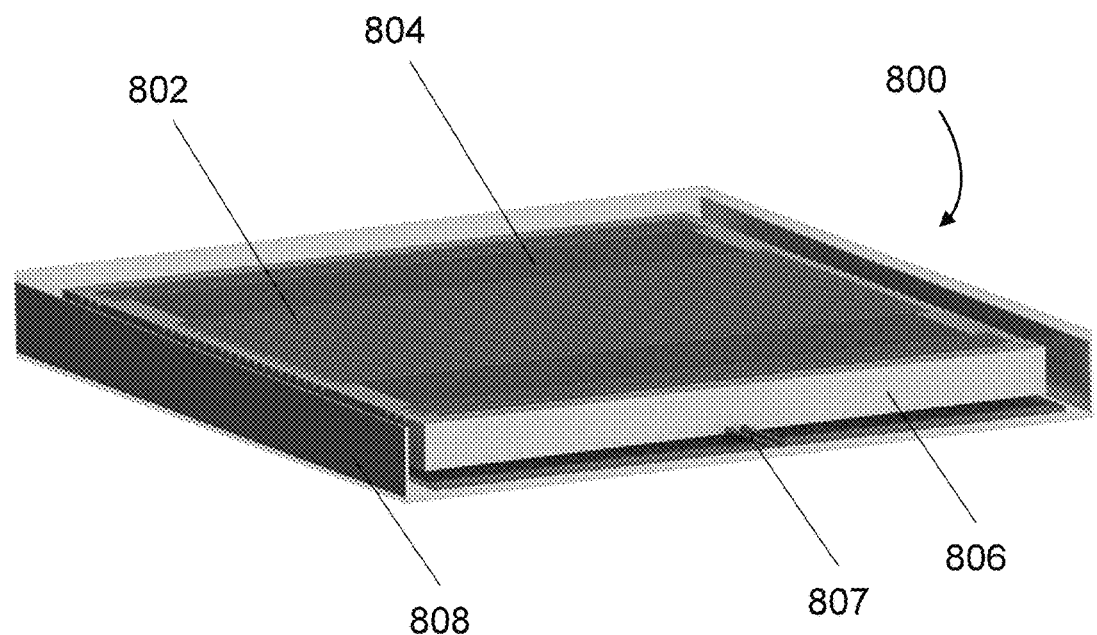
FIGS. 8A-8C show an exemplary ground assembly including a transmitter used in a dynamic wireless charging system in accordance with the invention.
Figure 8B:
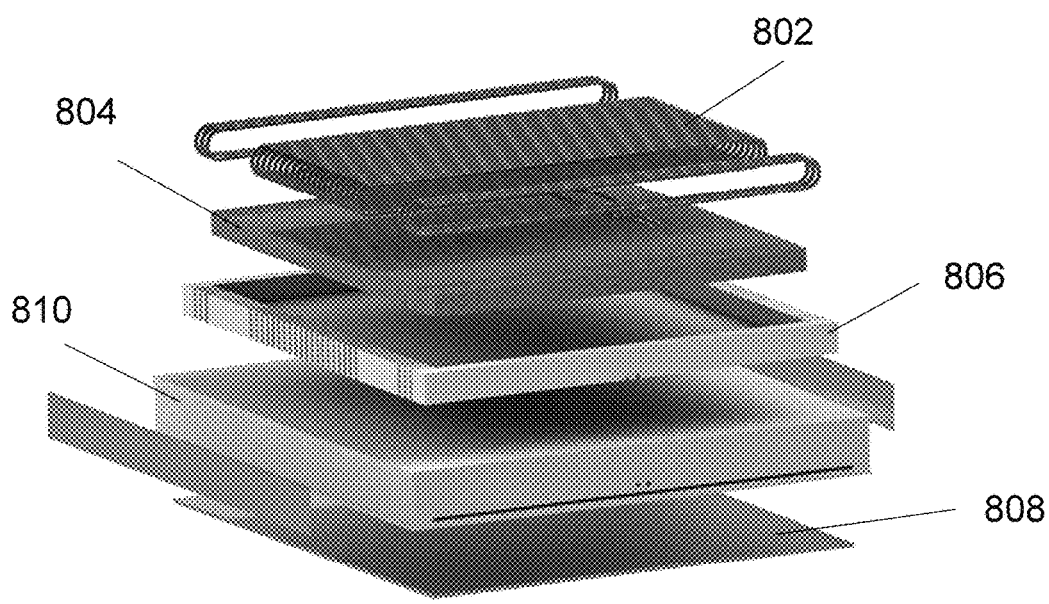
Figure 8C:
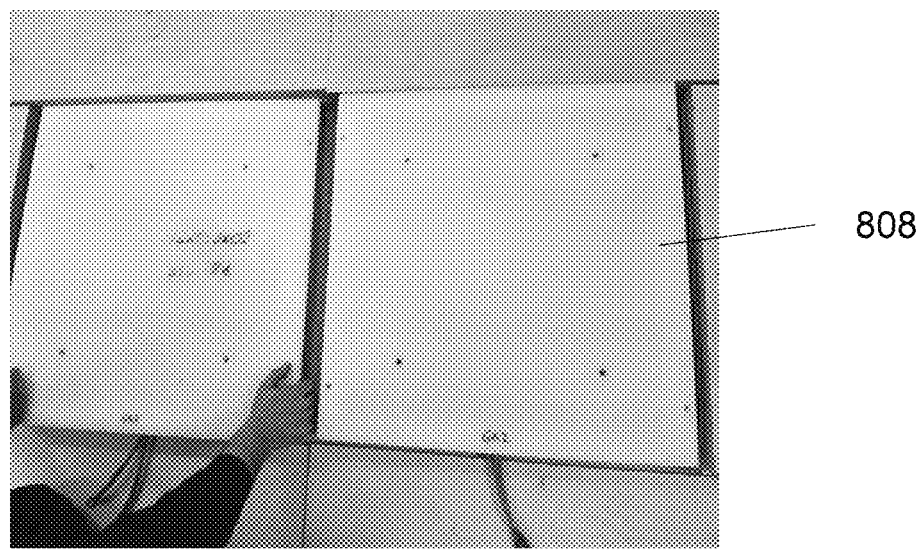

FIGS. 8A-8C show an exemplary ground assembly including a transmitter used in a dynamic wireless charging system.

Referring to FIGS. 8A-8C, ground assembly 800 includes a transmitter coil 802 wound around a ferromagnetic core 804 disposed within housing 808. The transmitter coil 802 and ferromagnetic core 804 are disposed on substrate 806 including terminals 807 which are capable of being coupled with a power source.

As illustrated in FIG. 8C, housing 808 can be embedded within a floor such that a receiving coil coupled to a vehicle assembly can come into alignment with the ground assembly 800 to create coupling and initiate wireless power transfer while the vehicle is moving. In an exemplary embodiment, transmitter coil 802 may be provided on substrate 810.

Figure 9A:
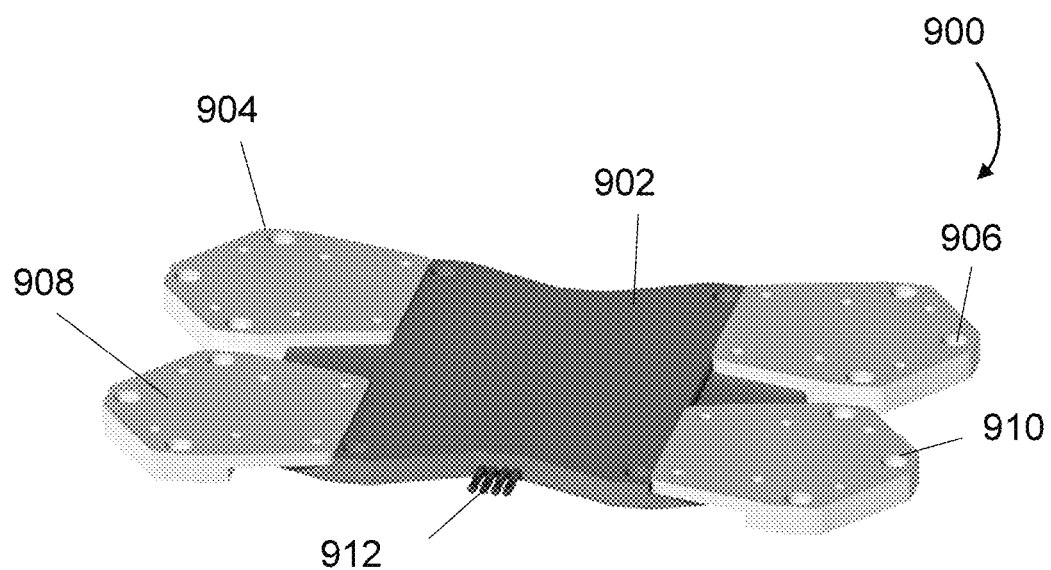
FIGS. 9A-9B show an exemplary vehicle assembly used in a dynamic wireless charging system in accordance with the invention.
Figure 9B:
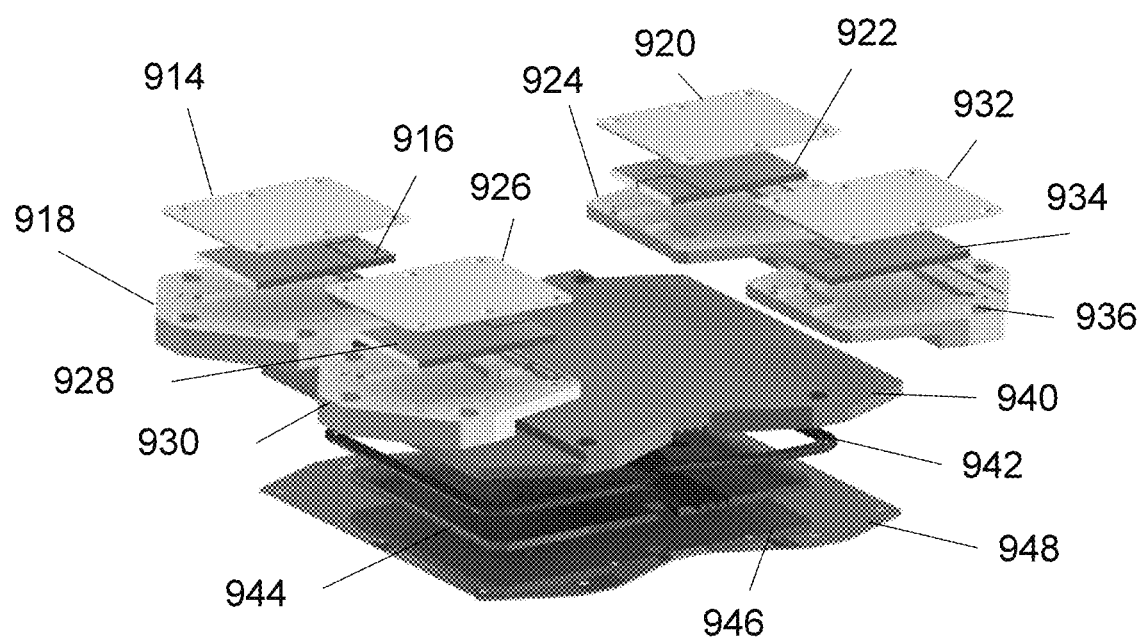

FIGS. 9A-9B show an exemplary receiving coil assembly configured to be mounted on a vehicle assembly used in a dynamic wireless charging system in accordance with the invention.

Referring to FIGS. 9A-9B, receiving coil 900 includes a receiver coil assembly 902, a plurality of wing assemblies 904, 906, 908, 910, and terminals 912. While FIGS. 9A-9B illustrate four wings, any number of wings may be implemented. Terminals 912 can be in communication with a rectifier that converts an AC current generated in the receiving coil 900 into a direct current (DC) such that the DC current output is provided to a battery or power source to complete the power transfer.

Each of the wing assemblies 904, 906, 908, 910 includes an upper housing plate 914, 920, 926, 932, a ferromagnetic wing 916, 922, 928, 934, and a lower housing plate 918, 924, 930, 936. Receiver coil assembly 902 includes an upper housing plate 940, a receiving coil 942, a ferromagnetic core 944, a substrate 946, and a lower housing plate 948.

While receiving coils 200, 708, and 900 are described within a dynamic system such that alignment and charging are contemplated during movement of the vehicle, receiving coils 200, 708, and 900 can be implemented in a static charging system. That is, a transmitter coil can be mounted and the vehicle that includes the receiving coil 200, 708, and 900 can be parked above the transmitter coil such that alignment between the receiving coil 200, 708, and 900 and the corresponding transmitter coil can initiate coupling and wireless power charging while the vehicle remains stationary.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. The specification describes specific examples of accomplishing a more general goal that also may be accomplished in another way. Those skilled in the art will appreciate that the features described above can be combined in various ways to form multiple variations of the invention.

We claim:

1. A wireless inductive power transmission system comprising:
   a) a ground assembly including: a primary coil with a magnetic permeable core; and
   b) a vehicle assembly including:
      a secondary coil capable of being inductively coupled to the primary coil, and
      one or more magnetic permeable wings disposed on top of the secondary coil,
   wherein each of the one or more magnetic permeable wings overlap the secondary coil such that each of the one or more magnetic permeable wings extend within and beyond a periphery of the secondary coil for generating additional coupling between the primary coil and the secondary coil.

2. The wireless inductive system of claim 1, wherein a size and position of the one or more magnetic permeable wings are selected based on at least one of a power level of the wireless inductive power transmission system, an air gap between the ground assembly and the vehicle assembly, or an alignment characteristic between the ground assembly and the vehicle assembly.

3. The wireless inductive charging system of claim 1, wherein the inductive wireless charging system provides power in a range from 10 Watts to 2 mega Watts.

4. The wireless inductive charging system of claim 1, wherein the vehicle assembly is configured to be surface-mounted to a surface of a vehicle such that charging occurs while the vehicle is moving.

5. The wireless inductive charging system of claim 1, wherein the ground assembly is configured to be mounted in-ground such that the vehicle assembly aligns with the ground assembly while the vehicle is moving.

6. The wireless inductive charging system of claim 1, wherein coupling between the primary coil and the secondary coil provides continuous power transfer to a charging circuit in communication with the vehicle assembly.

7. The wireless inductive charging system of claim 1, wherein coupling between the primary coil and the secondary coil provides a coupling coefficient of at least 0.075.

8. The wireless inductive charging system of claim 1, wherein the wireless inductive charging system is a stationary wireless inductive charging system.

9. The wireless inductive charging system of claim 1, wherein the vehicle assembly moves relative to the ground assembly to form a dynamically wireless inductive charging system.

10. The wireless inductive charging system of claim 9,
wherein the primary coil includes the magnetic permeable core,
wherein the ground assembly includes an additional primary coil disposed in the magnetically permeable core,
wherein the vehicle assembly moves relative to the primary coil and the additional primary coil, and
wherein coupling between the primary coil, the additional primary coil, and the secondary coil at a transition region between the coils provides a coupling coefficient of at least 0.075.

* * * * *